United States Patent
Kraus

(10) Patent No.: US 7,322,510 B2
(45) Date of Patent: Jan. 29, 2008

(54) MACHINING SYSTEM

(75) Inventor: Gerhard Kraus, Friedberg (DE)

(73) Assignee: KUKA Systems GmbH, Augsburg (DE)

( * ) Notice: Subject to any disclaimer, the term of this patent is extended or adjusted under 35 U.S.C. 154(b) by 177 days.

(21) Appl. No.: 10/517,693

(22) PCT Filed: Jul. 23, 2003

(86) PCT No.: PCT/EP03/08016

§ 371 (c)(1),
(2), (4) Date: Dec. 8, 2004

(87) PCT Pub. No.: WO2004/012898

PCT Pub. Date: Feb. 12, 2004

(65) Prior Publication Data
US 2005/0224557 A1 Oct. 13, 2005

(30) Foreign Application Priority Data
Jul. 30, 2002 (DE) .................... 202 11 755 U

(51) Int. Cl.
*B23K 37/04* (2006.01)
*B23K 37/047* (2006.01)
(52) U.S. Cl. .............. 228/4.1; 228/44.3; 228/47.1; 228/49.1
(58) Field of Classification Search .............. None
See application file for complete search history.

(56) References Cited

U.S. PATENT DOCUMENTS 4,701,994 A * 10/1987 Noh et al. ............... 483/58
5,152,050 A * 10/1992 Kaczmarek et al. .......... 29/711
5,645,884 A * 7/1997 Harlow et al. ............. 427/8
6,421,893 B1 * 7/2002 Katayama et al. .......... 29/33 K
6,932,263 B2 * 8/2005 Kilabarda et al. .......... 228/49.1
2002/0134815 A1 * 9/2002 Angel ..................... 228/49.1
2003/0183361 A1 * 10/2003 Laurino ................... 164/323

FOREIGN PATENT DOCUMENTS

| DE | 32 12 272 | 10/1983 |
|----|-----------|---------|
| DE | 197 13 860 | 10/1998 |
| DE | 197 53 813 | 10/1998 |
| DE | 197 13 996 | 11/1998 |
| DE | 298 04 850 | 9/1999 |
| DE | 298 13 669 | 1/2000 |
| DE | 199 34 618 | 1/2001 |
| FR | 2 712 833 | 6/1995 |
| FR | 2712833 A1 * | 6/1995 |
| FR | A-2 712 833 | 6/1995 |

* cited by examiner

Primary Examiner—Kiley Stoner
(74) Attorney, Agent, or Firm—McGlew and Tuttle, P.C.

(57) ABSTRACT

A machining system and unit, especially a welding cell, is provided for use for the machining of workpieces (2), especially body parts of vehicles. The machining system has one or more machining stations (15, 16) with robots (18, 19, 20) and at least one rotation or turning station (5), which has at least two work stations (6, 7) for carrying out different operations simultaneously. The turning station (5) has at least two said multiaxially movable turning units (8, 9) arranged next to one another with said gripping tools (11, 12, 13). The working areas (10) intersect each other at the work stations (6, 7).

18 Claims, 2 Drawing Sheets

MACHINING SYSTEM

CROSS REFERENCE TO RELATED APPLICATIONS

This application is a United States National Phase application of International Application PCT/EP2003/008016 and claims the benefit of priority under 35 U.S.C. § 119 of German Application DE 1202 11 755.3 filed Jul. 30, 2002, the entire contents of which are incorporated herein by reference.

FIELD OF THE INVENTION

The present invention pertains to a machining unit, especially a welding cell especially body parts of vehicles, with one or more machining stations with said robots and at least one turning station which has at least two said work stations for carrying out different operations simultaneously.

BACKGROUND OF THE INVENTION

Such machining units, especially welding cells, have been known from practice. They are used for the multistep machining of workpieces, especially of parts or complete bodies of motor vehicles. The unit comprises a plurality of machining stations with robots and has, in addition, at least one turning station, which has at least two work stations for carrying out different operations simultaneously. The turning station is designed in practice as a turntable.

SUMMARY OF THE INVENTION

The object of the present invention is to provide an improved machining unit.

According to the invention, a machining unit is provided, especially a welding cell, for the machining of workpieces, especially body parts of vehicles. The machining unit is provided with one or more machining stations with robots and at least one turning station, which has at least two work stations for carrying out different operations simultaneously. The turning station has at least two multiaxially movable turning units arranged next to one another with gripping tools and with said working areas. The at least two multiaxially movable turning units intersect each other at the work stations.

The replacement of the turntable with two or more multiaxially movable turning units offers various advantages. On the one hand, the reliability of operation and flexibility are increased due to the two independent turning units. The turning units can evade each other thanks to the multiaxial mobility and offer a larger amount of functions and improved adaptability to different tasks than the prior-art simple turntables. On the other hand, the turning units and the work stations can be uncoupled from one another functionally and in time within certain limits.

The use of transport robots, especially multiaxial articulated arm robots, as a turning unit offers additional advantages. On the one hand, the ergonomics can be improved at work stations served manually, especially at feed sites for feeding and completing workpieces. Due to its degrees of freedom, the robot with its gripper is able to assume an ergonomically optimized position for the feed operations. On the other hand, this flexibility of positioning can also be used to take up different workpieces from a conveyor system. A robot can adapt itself substantially better and above all without structural conversions to changing workpiece pick-up situations. Furthermore, a turning station equipped with robots offers a substantially higher working flexibility because different workpieces can be picked up and transported in a free mix. This can also be achieved by the availability of the turning station, which was mentioned in the introduction. In case of failure of a robot, the other robot or the other robots can still continue working, as a result of which downtime of the unit is avoided.

Robots also have substantial advantages over a turntable at the other work station, which is preferably designed as a joining site, especially a welding site. The transport robot can bring the workpiece being held into a position favorable for machining and also change this position when needed, which is not possible with a turntable. Even though the real costs are higher in case of a robot-supported turning station, due to the robots, than in case of a turntable, the investment needed to flexibilize the turning station and consequently the entire machining unit is substantially lower than in case of a turntable.

A special advantage of the robot-supported turning station is the markedly increased model flexibilization. In conjunction with bilateral gripper storage units and gripping tools, which are related to the particular models and are kept ready there, the transport robots can simultaneously handle and machine in the unit not only different basic models, but also additional variants within one model, e.g., left and right side wall parts.

The turning units may be designed as rotatable transport robots. The transport robots may be designed as stationary or unstationary, multiaxial articulated arm robots and as heavy-load robots with a load carrying capacity of about 500 kg or more.

The turning units may carry replaceable gripping tools for different workpieces, especially different body models. A plurality of gripper storage units may be arranged in the working area of the turning units. The gripping tools may be designed as geometry grippers, which hold the workpiece in a defined position.

One work station may be designed as a workpiece pick-up and the other work station may be designed as a joining site, preferably a welding site.

The turning station with at least one said work station may be connected in the transfer direction to at least one machining station equipped with one or more robots. The work station(s) is/are located in the working area of the robots. The machining station may have at least one workpiece storage unit for the replaceable robot tools in the working area of the robots. The machining station may have one or more component feeds in the working area of the robots. The machining station may have one or more stationary machining devices in the working area of the robots. The machining unit may have a manual or automatic workpiece feed means at the inlet of the transfer line and a manual or automatic workpiece storage unit at the outlet. The workpiece feed means and/or the workpiece storage unit may form a work station of one of the turning stations.

The present invention is shown in the drawings schematically and as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
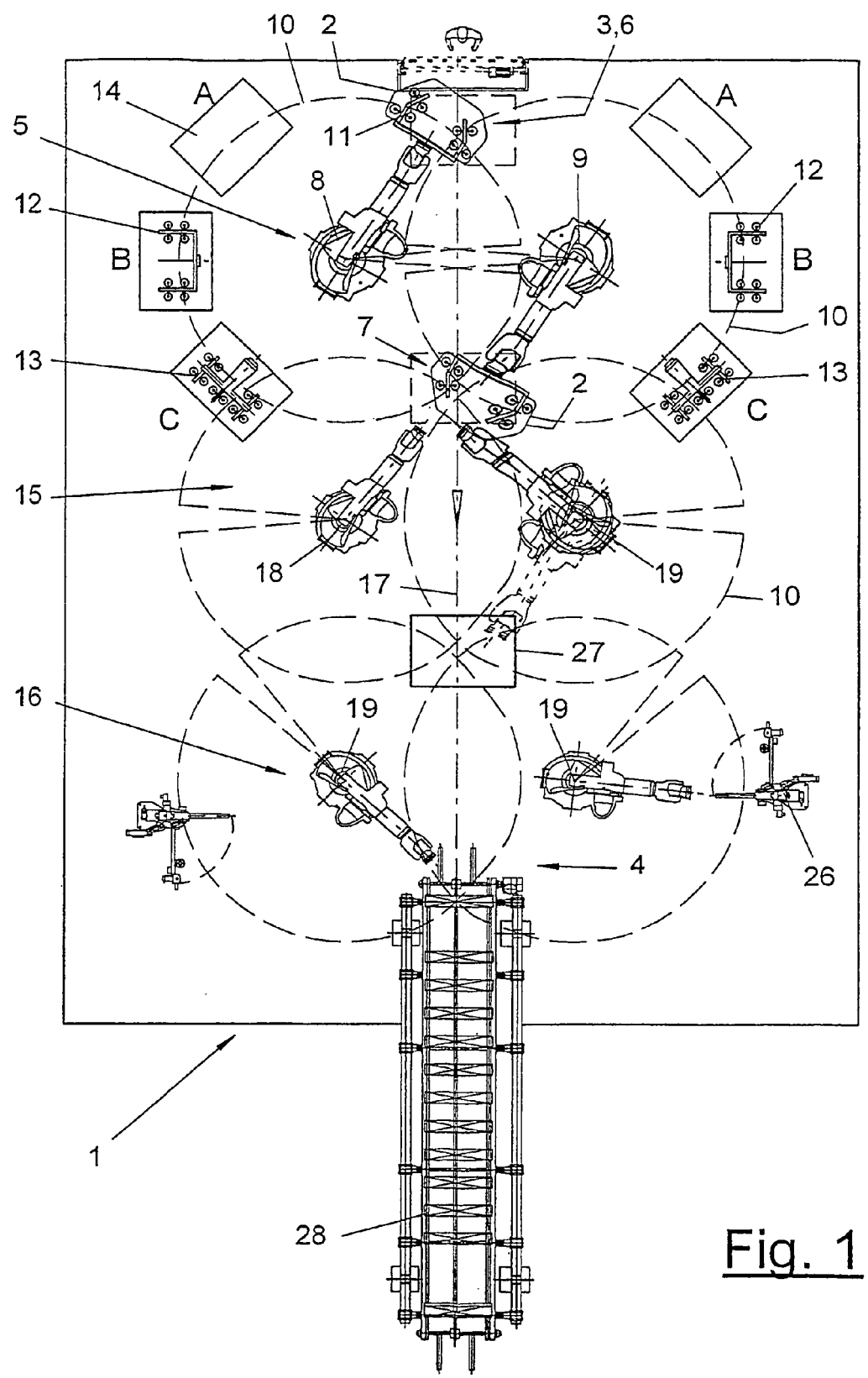
FIG. 1 is a schematic top view of a machining unit with a turning station and two machining stations for a flexible mix of models.
Figure 2:
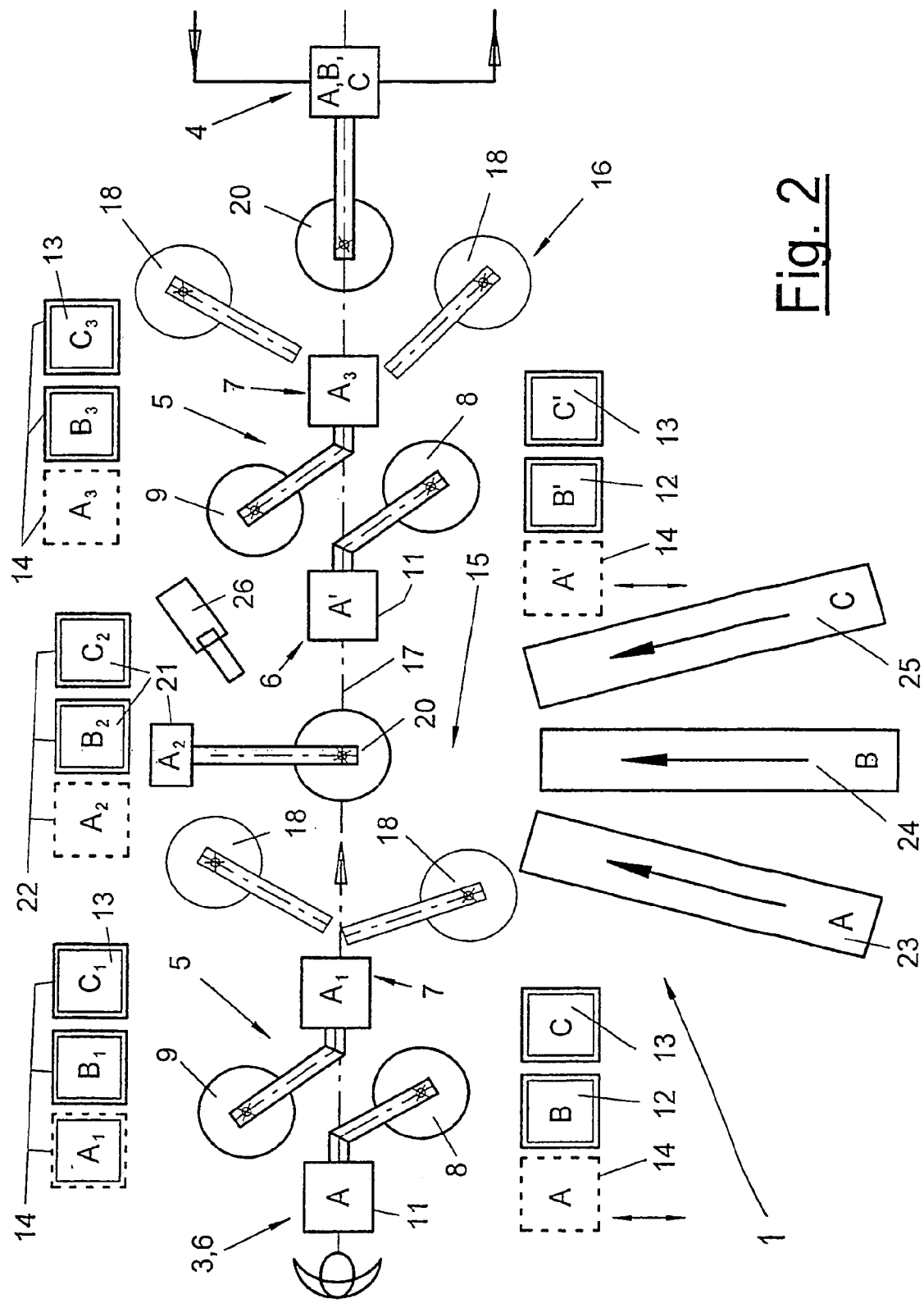
FIG. 2 is a schematic top view of an expanded machining unit with two turning stations and an additional flexibilization for model variants.

Referring to the drawings in particular, FIGS. 1 and 2 schematically show top views of a machining unit 1, here, e.g., a welding cell, for the multistep machining of workpieces 2. The workpieces 2 are parts of vehicle bodies or complete bodies. One or more turning stations 5 and one or more machining stations 15, 16 are arranged one after another along a transfer line 17 within the machining unit 1. The transfer line 17 may extend in a straight line, as in the exemplary embodiment being shown. As an alternative, it may also be bent at an angle. A manual or automatic workpiece feed means 3 is located at the inlet of the unit 1. A likewise manual or automatic workpiece discharge unit 4 is arranged on the outlet side. At least one worker, who feeds the workpieces 2 manually, introduces them and optionally introduces additional components at the workpiece, is located at the workpiece feed means 3 in the exemplary embodiments shown. The workpiece discharge unit 4 comprises a suitable conveyor 28, e.g., an accumulating conveyor. The workpieces 2 shown are, e.g., front and rear floor panels, doors, engine hoods, etc.

The machining unit 1 is flexible and permits the machining of a plurality of different body models A, B, C in a freely selectable mix. In the unit 1 according to FIG. 2, additional model variants, e.g., left and right side parts or doors may also be manufactured in the unit 1 simultaneously or in a free mix. The unit 1 according to FIG. 1 may also be expanded correspondingly.

The machining unit 1 comprises at least one turning station 5 and one or more machining stations 15, 16. One turning station 5 and two machining stations 15, 16 are arranged one after another in the transfer direction 17 in the embodiment according to FIG. 1. In the variant according to FIG. 2, a turning station 5 is arranged on the inlet side, and it is joined in the transfer direction 17 by a machining station 15, which is in turn followed by a second turning station 5 and then by a second machining station 16.

A turning station 5 is preferably arranged at least on the inlet side of the unit 1. The turning station 5 has two or more work stations 6, 7, of which one work station 6 is associated with the workpiece feed means 3. The other work station 7, which is usually located opposite in the transfer direction 17, is preferably a joining site, especially a welding site, at which the workpiece 2 fed in is machined in a suitable manner. The second work station 7 is identical to the interface to the next machining station 15 or 16. In the unit 1 according to FIG. 2, the first work station 6 with the workpiece pick-up at the second turning station 5 is also the interface with the discharge side of the upstream machining station 15.

The turning stations 5 comprise two or more multiaxially movable, independent turning units 8, 9, which are arranged next to each other and are coordinated with one another in terms of their movements and functions. The turning units 8, 9 can rotate around the vertical axis and are equipped with gripping tools 11, 12, 13, which are preferably replaceable and are adapted to the particular body model or optionally also to the model variant. The turning units 8, 9 may have any desired design. They are preferably rotatable, multiaxial transport robots.

FIG. 1 illustrates the working areas 10 of the two transport robots 8, 9, which intersect each other at the work stations 6, 7. As a result, the transport robots 8, 9 can alternatingly approach the work stations with their gripping tools 11, 12, 13 and permit the above-mentioned different operations to be performed with the workpiece mount and the joining machining independently from one another.

The transport robots 8, 9 are designed as stationarily arranged articulated arm robots with preferably six axes in the preferred embodiment. One or more auxiliary axes may optionally be present. In a variant of the embodiment being shown, the transport robots 8, 9 may be positioned movably or unstationarily and perform additional turning or travel movements by means of suitable travel axes. In the exemplary embodiment being shown, the transport robots 8, 9 are preferably arranged on both sides of and mirror symmetrically to the transfer line 17. This arrangement may also be changed as an alternative. The transport robots 8, 9 are preferably designed as heavy-load robots and have a load carrying capacity of about 500 kg or more. The transport robots 8, 9 are connected with their robot controls to a higher-level unit control and their functions and movements are coordinated with one another via the control not shown. They move without collision between the work stations 6, 7 and preferably on separate paths located on the outside and in opposite directions.

However, the transport robots 8, 9 may be uncoupled from one another to the extent that they do not have to perform all movements and functions with mirror symmetrical synchronization and also not always in the same cycle. This happens especially when a mix of different workpieces 2 with different process times are machined. Process, transport and other ancillary times, e.g., tool change times, can be handled flexibly and optionally changed and adapted for compensation.

Depending on the workpiece flexibility, one or more gripper storage units 14 for different gripping tools 11, 12, 13 may be arranged at the turning station 5 in the working area 10 of the transport robots 8, 9. Three gripper storage units 14 may be arranged in a row or in an arc for each transport robot 8, 9 as shown in FIGS. 1 and 2. The gripper storage units 14 are intended for particular models and model variants and may be provided with suitable conveyors for introducing and removing the gripping tools 11, 12, 13. The gripping tools can thus be replaced or removed and introduced for measuring and maintenance work or for other purposes.

Three different models A, B, C of workpieces 2 are machined in the unit 1 according to FIG. 1. The two transport robots 8, 9 have three gripping tools 11, 12, 13 intended for the particular models for this purpose, and both transport robots 8, 9 have the same set of tools. As is illustrated in FIG. 1, the gripping tools 11, 12, 13 are preferably designed as so-called geometry grippers or geo grippers, which grip and hold the workpieces 2 in exactly defined positions.

In addition to the three workpiece models A, B, C, two model variants are processed in the unit 1 according to FIG. 2. The transport robots 8, 9 correspondingly have different sets of grippers A, B, C and A1, B1 and C1 as well as corresponding gripper storage units 14.

At the workpiece feed means 3, the transport robots 8, 9 hold the gripping tool 11, 12, 13 being held in a position that is ergonomically favorable for the worker for feeding the workpieces 2 and optionally additional components. This feed position is freely selectable and may, in addition, also be changed within the models according to the model variants, which requires only a reprogramming of the transport robot 8, 9. Likewise, only a reprogramming of the transport robots 8, 9 and the provision of correspondingly changed and adapted gripping tools 11, 12, 13 are required at the turning station 5 even in case of a complete change of the workpieces to completely different kinds and optionally also to completely different models and model variants of workpieces.

As an alternative to the manual feed of the workpieces 2 by a worker, the workpieces 2 may also be transferred at the work station 6 to the gripping tools 11, 12, 13 mechanically and automatically. Such a design is shown, for example, in FIG. 2 at the second turning station 5 and the work station 6 located there. A robot 20, which has primarily conveying and handling tasks and transfers the workpiece to the waiting transport robots 8, 9 of the second turning station 5 after the completion of the machining of the workpiece in the machining station 15, is arranged in the upstream machining station 15. This transfer preferably follows directly in the so-called handshake operation. The gripping tools of the robots 8, 9, 20 are designed correspondingly for this purpose. As an alternative, the transfer may also take place by means of an interposed workpiece storage unit on a table not shown.

At the work station 7 and the joining site located there, the corresponding transport robot 8, 9 holds the workpiece 2 in the turning stations 5 in a defined machining position. One or more robots 18, e.g., welding robots, which carry out the machining of the workpiece 2, are positioned in the machining station 15, 16. The transport robot 8, 9 can also reorient the workpiece 2 during the machining. Besides welding operations, any other machining operations may be carried out as well. The machining tools of the robots 18 are not shown in the drawings for clarity's sake.

A welding robot 18 and a combined welding and transport robot 19 are arranged in the unit 1 according to FIG. 1. After the completion of the joining operation at the work station 7, the robot 19 changes its joining tool to a suitable gripper, takes over the workpiece 2 being kept ready from the corresponding transport robot 8, 9 and transports same to the next machining station 12, depositing same, for example, on a workpiece storage unit 27. The robot 19 then changes the tool again and is ready for the next joining operation.

Two similarly configured robots 18, 19, which are designed as pure machining robots, especially welding robots, as pure transport robots or optionally as a mixed form and are equipped with corresponding, optionally replaceable tools, are arranged at the second machining station 16. The robots 18, 19 perform, e.g., primarily handling tasks in FIG. 1, transporting the workpiece 2 picked up from the workpiece storage unit 27 to one or more stationary machining devices 26 in their working area 10, e.g., to stationary welding tongs, adhesive applicators, etc., and guide them along there. Finally, one or both robots 18, 19 transfer the workpiece 2 to the workpiece storage unit 4, e.g., the conveyor 28 shown.

In the more complex unit 1 according to FIG. 2, a transport robot 20, which has one or more, optionally replaceable tools 21 for joining or for handling, is arranged next to the two welding robots 18 in the first machining station 15. A plurality of tool storage units 22 for different tools 21 intended for different models are arranged here, e.g., at the edge of the working area. These are, for example, the tool models A2, B2 and C2.

A plurality of component feeds 23, 24, 25 for different components related to the workpiece models A, B and C are arranged on the other side of the machining station 15. When these components are identical within the model variants, which may be the case, for example, with left and right door components, a number of component feeds 23, 24, 25 corresponding to the number of models is sufficient. If the components also differ within the model variants, the number of component feeds may increase correspondingly. It may also be possible to work with one or more flexible component feeds, which keep ready different model-related or model variant-related components.

After the completion of the machining operation of the welding robots 18 at the work station 7 of the first turning station 5, the transport robot 20 can take over the workpiece 2 from the corresponding transport robot 8, 9 with the existing gripping tool or optionally with a changed gripping tool and feed it to a stationary machining device 26 and optionally guide it along. After the completion of this operation, it introduces the workpiece 2 to the transport robot 8, 9 standing by in the next turning station 5 and to the gripping tool 11, 12, 13 of the said transport robots in the above-described manner.

The transport robot 20 with its tool 21 can then pick up one or more loose components from the component feeds and add it/them to the deposited workpiece 2 at the second turning station 5.

As an alternative, the transport robot 20 may also perform additional joining and/or handling operations between these transfer operations.

In the second turning station 5 according to FIG. 2, a plurality of gripper storage units 14 for corresponding model-related and optionally also variant-related gripping tools 11, 12, 13 are again located at the edge of the working area of the transport robots 8, 9. These [gripping tools] may differ from the set of grippers of the first turning station 5 and are therefore identified by the designations A', B' and C' as well as A3, B3 and C3. As is illustrated in FIG. 2, the transport robots 8, 9 also hold different gripping tools A/A1 and A'/A3 in the two turning stations 5. Joining operations are again performed by the two welding robots 18 of the second machining station 16 at the work station 7 of the second turning station 5, and, for example, the components prepared for the operation in the preceding station are joined, e.g., tacked and/or fully welded. An additional transport robot 20, which takes over the workpiece 2 after the completion of the joining operation and transports same to the workpiece discharge unit 4, is likewise arranged in the second machining station 16.

Various variants of the embodiments being shown are possible. On the one hand, the number and the arrangement of the different stations 5, 15, 16 within the machining unit 1 may vary as desired. Furthermore, the number and the arrangement of the gripper storage units 14 and the gripping tools 11, 12, 13 as well as the necessary or desired variety of models or variants are variable as well.

Furthermore, the design and the outfit of the machining stations 15, 16 may be varied as desired as well. This pertains not only to the number, arrangement and scope of tasks of the robots 18, 19, 20, but to those of other action components as well. The welding robots 18 may, furthermore, also have replaceable machining tools and have corresponding workpiece storage units not shown in their working area.

The units 1 shown in FIGS. 1 and 2 may be built up in the configuration shown immediately at the time of the manufacture. However, as an alternative, they may also be prepared in parts, in which case, e.g., one half of the unit is first built up on one side of the transfer line 17 and the second half is added only later. This minimizes the initial investment and permits the expansion of the machining unit 1 as needed and a purposeful flexibilization when needed. It would also be possible to halve the turning stations 5 at first and have them assume their full function only at the stage of the final expansion.

Furthermore, it is possible to accommodate more than two transport robots 8, 9 in one turning station 5 and, in addition, to create more than two work stations 6, 7. The transfer line 17 may also branch off. Furthermore, it is possible to build up a plurality of the machining units 1 shown next to one another and to arrange on the inlet side and the outlet side movable workpiece feed means 3 and workpiece discharge units 4, which alternatingly serve the parallel units. Furthermore, it is possible to approach a plurality of workpiece feed means 3 and workpiece discharge units 4 with the transport robots 8, 9 and the turning stations 5. The number and the arrangement of these workpiece feed means and workpiece discharge units depends on the cycle time of the unit 1 and the complexity of the feed and discharge operations.

While specific embodiments of the invention have been shown and described in detail to illustrate the application of the principles of the invention, it will be understood that the invention may be embodied otherwise without departing from such principles.

The invention claimed is:

1. A machining unit, for the machining of workpieces, the machining unit comprising:
   one or more machining stations each with robots including a robot with a welding tool; and
   at least one turning station having at least two work stations for carrying out different operations simultaneously, said turning station having at least two multiaxially movable turning units arranged next to one another with gripping tools and with movable turning units working areas, which intersect each other at said work stations, one work station being a workpiece support and another work station being a joining station, said robot with said welding tool being arranged with a range of operation such that said joining tool at said welding station performs joining operations at said joining station.

2. A machining unit in accordance with claim 1, wherein said turning units are designed as said rotatable transport robots.

3. A machining unit in accordance with claim 1, wherein said transport robots are designed as stationary or unstationary, multiaxial articulated arm robots.

4. A machining unit in accordance with claim 1, wherein said transport robots are designed as heavy-load robots with a load carrying capacity of about 500 kg or more.

5. A machining unit in accordance with claim 1, wherein said turning units carry said replaceable gripping tools for said different workpieces corresponding to different body models.

6. A machining unit in accordance with claim 1, wherein a plurality of gripper storage units are arranged in said working area of said turning units.

7. A machining unit in accordance with claim 1, wherein said gripping tools are designed as geometry grippers, which hold said workpiece in a defined position.

8. A machining unit in accordance with claim 1, wherein one said work station is designed as a workpiece pick-up and said other work station as a joining welding site.

9. A machining unit in accordance with claim 1, wherein said turning station with at least one said work station is connected in said transfer direction to at least one said machining station equipped with one or more said robots, wherein said work station(s) is/are located in said working area of said robots.

10. A machining unit in accordance with claim 1, wherein said machining station has at least one workpiece storage unit for a replaceable robot tools in said working area of said robots.

11. A machining unit in accordance with claim 1, wherein said machining station has one or more component feeds in said working area of said robots.

12. A machining unit in accordance with claim 1, wherein said machining station has one or more stationary machining devices in said working area of said robots.

13. A machining unit in accordance with claim 1, wherein said machining unit has a manual or automatic workpiece feed means at the inlet of transfer line and a manual or automatic workpiece storage unit at the outlet.

14. A machining unit in accordance with claim 13, wherein said workpiece feed means and/or said workpiece storage unit forms a work station of a turning station.

15. A machining unit for machining workpieces, the machining unit comprising:
   a plurality of welding machining stations having multiaxially movable welding robots with a welding tool head for welding the workpieces, each welding robot moving to form a defined working area;
   a plurality of turning stations having at least two multiaxially movable turning units having a gripping tool head, one turning station being arranged adjacent to another turning station, each turning unit moving to form a defined working area, said working area of said turning unit overlapping said working area of said welding robot to define at least two work stations, one work station being a workpiece pick up work station and another work station being a welding work station, said turning unit picking up the workpiece at said workpiece pick up work station and transferring the workpiece to said welding work station;
   a manual or automatic feed means for presenting the workpieces to said plurality of turning stations; and
   a manual or automatic removal means for removing workpieces.

16. A machining unit in accordance with claim 14, wherein a first welding robot is arranged adjacent to a second welding robot such that the working area of said first welding robot intersects with the working area of said second welding robot and intersects with the working area of said turning unit at said welding work station.

17. A machining unit or the machining of workpieces, the machining unit comprising:
   a first turning station having a first multiaxially movable turning unit with a first gripping tool, said first multiaxially movable turning unit being movable to define a first movable turning unit work volume;
   a second turning station having a second multiaxially movable turning unit with a second gripping tool, said second movable turning unit being to define a second movable turning unit work volume, said first turning station being arranged next to said second turning station, said first movable turning unit work volume overlapping with said second movable turning unit work volume to define a first work station for picking up the workpiece and a second work station for welding the workpiece, said first turning unit or said second turning station picking up the workpiece at said first work station and transferring the workpiece to said second work station;

a welding station having a multiaxially movable welding robot, said movable welding robot having a welding tool for welding the workpiece, said welding robot moving to define a welding work volume, said welding work volume overlapping said second movable turning unit work volume at said second work station;

a manual or automatic feed means for presenting the workpieces to said first turning station.

18. A machining unit in accordance with claim 17, further comprising a manual or automatic removal means for removing workpieces.

* * * * *

UNITED STATES PATENT AND TRADEMARK OFFICE
CERTIFICATE OF CORRECTION

PATENT NO. : 7,322,510 B2  
APPLICATION NO. : 10/517693  
DATED : January 29, 2008  
INVENTOR(S) : Gerhard Kraus Page 1 of 1

It is certified that error appears in the above-identified patent and that said Letters Patent is hereby corrected as shown below:

In Claims - Col. 7, lines 32-47 should read —
1. A machining unit, for the machining of workpieces, the machining unit comprising: one or more machining stations each with robots including a robot with a welding tool; and at least one turning station having at least two work stations for carrying out different operations simultaneously, said turning station having at least two multiaxially movable turning units arranged next to one another with gripping tools and with movable turning units working areas, which intersect each other at said work stations, one work station being a workpiece support and another work station being a joining station, said robot with said welding tool being arranged with a range of operation such that said welding tool at said joining station performs joining operations at said joining station.

Signed and Sealed this

Twenty-fifth Day of August, 2009

David J. Kappos  
*Director of the United States Patent and Trademark Office*